United States Patent [19]
Uecker

[11] 3,893,651
[45] July 8, 1975

[54] MAGNETIC BALL CHECK VALVE

[75] Inventor: Donald Frederick Uecker, Simsbury, Conn.

[73] Assignee: Combustion Engineering, Inc., Windsor, Conn.

[22] Filed: May 18, 1973

[21] Appl. No.: 361,672

[52] U.S. Cl................ 251/82; 176/19 R; 136/230; 251/65
[51] Int. Cl.......................................... F16k 31/44
[58] Field of Search .............. 138/90; 251/65, 82; 137/322; 176/19 R; 73/375; 136/230, 231

[56] References Cited
UNITED STATES PATENTS

| 315,273 | 4/1885 | Gilbert................................ 251/82 |
| 2,749,181 | 6/1956 | Maxwell et al................. 251/65 X |
| 2,898,128 | 8/1959 | Shohan............................. 137/322 X |
| 3,081,631 | 3/1963 | Switzer, Jr. et al............. 73/375 X |
| 3,159,167 | 12/1964 | Mueller et al................. 251/65 X |
| 3,246,521 | 4/1966 | Humphrey....................... 73/374 |
| 3,621,870 | 11/1971 | Harchol et al................. 137/322 |

*Primary Examiner*—Richard C. Queisser
*Assistant Examiner*—Daniel M. Yasich
*Attorney, Agent, or Firm*—Richard H. Berneike

[57] ABSTRACT

A magnetic ball check valve is disclosed for closing off dry tubes, wells or thimbles upon removal of a probe such as an instrument. The valve has a conical chamber containing the ball and a magnet exterior of the chamber to pull the ball upwardly to close off the opening. The insertion of the probe pushes the ball down and laterally outwardly, whereby the probe can pass downwardly through the chamber.

5 Claims, 2 Drawing Figures

MAGNETIC BALL CHECK VALVE

BACKGROUND OF THE INVENTION

It is often desirable or even necessary to insert probes, such as instrument probes, into an enclosure to determine or monitor conditions therein. In a number of these situations, it is not practical to insert the probe directly into the environment within the enclosure so that dry wells or "thimbles" are used. These are merely tubes which extend through the enclosure into the environment within the enclosure and which are completely closed to the enclosure environment. The probe is then inserted into the dry well from outside the enclosure. One example where such arrangements are used is on nuclear reactors where instrument probes such as temperature and neutron flux instruments are inserted into the dry wells.

The enclosures on which these dry wells are installed often are pressurized such as nuclear reactors. If a dry well tube were to develop a leak and the enclosure was pressurized, the contents of the enclosure would leak out through the dry well. For this reason, it has been conventional in the past to include a valve on the dry well tube which is open when the probe is in place in the dry well and which is closed when the probe is withdrawn. All the valves which have been used for this purpose in the past have been mechanically driven valves of one type or another. This requires that the valve actually be closed by an operator and this is sometimes difficult because these valves are in rather inaccessible locations as is the case with nuclear reactors.

SUMMARY OF THE INVENTION

The present invention is a valve which is particularly adapted to automatically close off a tube such as a dry well when a probe is withdrawn. More particularly this invention involves a ball check valve in which a magnet holds the ball in position to close the valve and which permits the ball to be displaced by the probe to permit insertion.

DESCRIPTION OF THE PREFERRED EMBODIMENT

Figure 1:
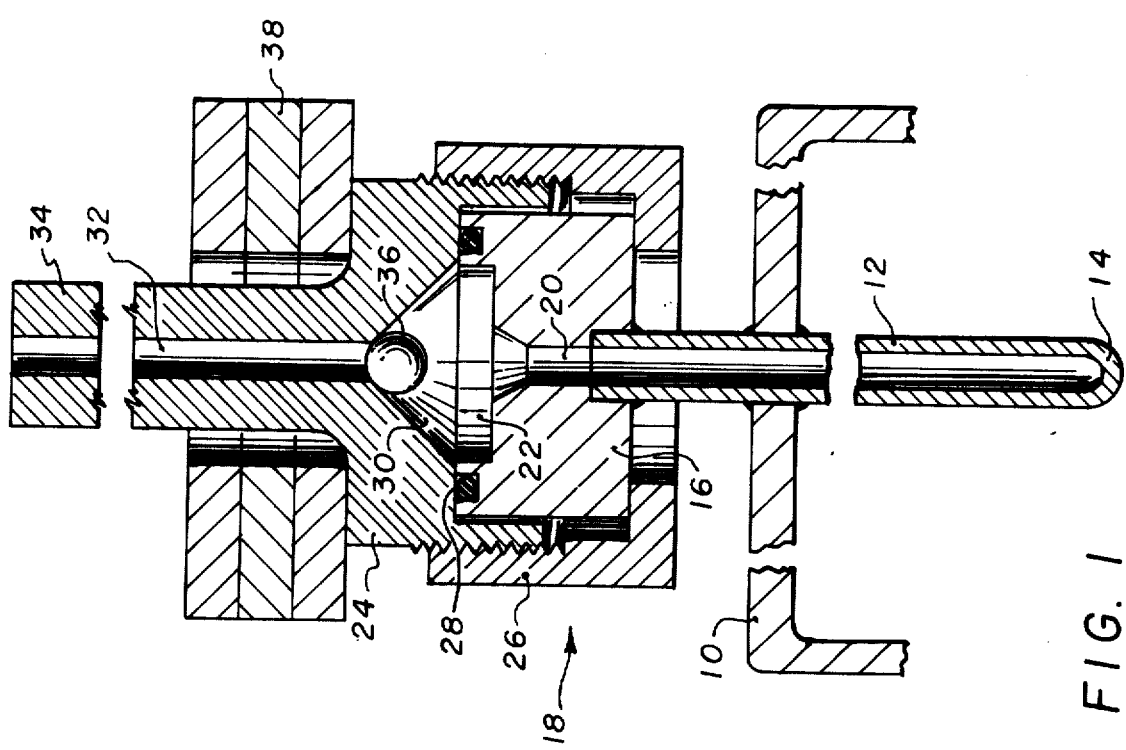
FIG. 1 is an elevational cross section view showing the valve in the closed position.

FIG. 1 illustrates the invention as applied to an enclosure or vessel 10 only a portion of which is shown. The tube 12 which is closed at the bottom end 14 constitutes the dry well which extends from outside the vessel 10 to the interior thereof and into which the probe is to be inserted. The tube 12 is shown as being welded to vessel 10 although any joining means can be used to prevent leakage. The tube 12 is attached to the lower block 16 of the magnetic check valve 18 such as by welding or any other joining technique. The lower block 16 also contains a channel 20 and a recess portion 22 in the upper surface thereof. The upper block 24 of the ball check valve 18 is attached to the lower block portion 16 by means of the retaining nut 26. The annular gasket 28 forms a seal between the upper and lower block portions. The upper block portion contains a conically shaped chamber 30 and a channel 32 leading from the apex of the conical chamber and up through the tubular extension 34 of the upper block 24. The ball 36 is contained in the conical chamber 30 and this ball serves to close off the channel 32 when it is in the position shown in FIG. 1. This ball 36 is held in this closed position shown in FIG. 1 by means of the annular magnet 38. In the event that a leak develops in the tube 12 and the interior of the vessel 10 is at a pressure above atmospheric pressure, the pressure leakage into the tube 12 will create an additional force to hold the ball 36 in its closed off position.

Figure 2:
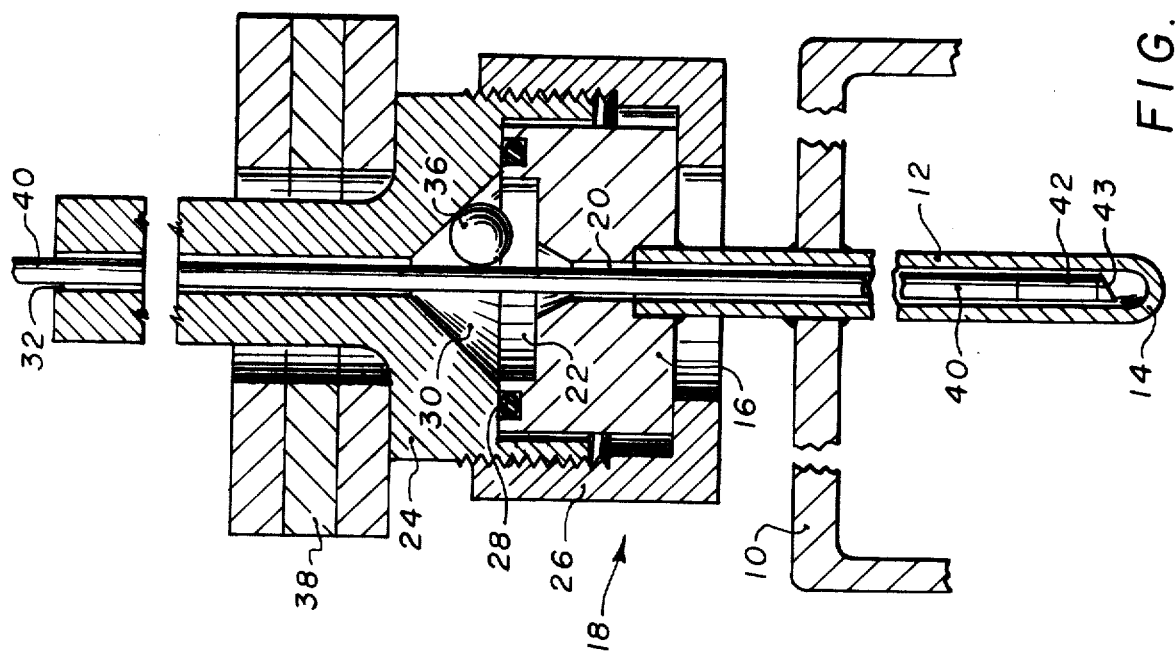
FIG. 2 is a view similar to FIG. 1 but showing the probe inserted and the valve in the open position.

FIG. 2 illustrates the present invention with the probe 40 having the desired instrument 42 on the end thereof inserted into the tube 12 through the ball check valve 18. As illustrated, the ball 36 is pushed downwardly and to the side by means of the probe 40. When the probe is again removed the ball 36 will be attracted upwardly by means of the magnet 38 so as to once again close off the channel 32. The end 43 of the probe 40 may be sloped as shown in FIG. 2 to ensure that the probe will push the ball to one side and not straight down which might prevent the probe from entering channel 20.

The present invention has been specifically conceived to operate in the vertical or near vertical orientation or at some downward slope with the valve being at the top. It will be noted that the magnet will pull the ball into the closed position at any orientation in which the slope of the conical surface is "uphill" towards the apex. Thus the invention is particularly adapted to be used when the orientation is such that the probe is inserted into the well in a downward direction. However, even when the probe is to be inserted upward and the slope of the conical surface is downhill, the magnet can assist gravity in pulling the ball to the closed position. The magnet for use in the present invention must create a magnetic circuit in the valve of sufficient strength to attract the ball to the apex of the conical chamber from anywhere in the chamber. However, the magnet should preferably not be oversized since this would require a greater force than necessary to push the ball away from the apex with the probe.

Although a specific embodiment of the present invention has been shown and described, it will be understood that this is merely illustrative and that changes may be made without departing from the invention as claimed.

What is claimed is:
1. A magnetic ball check valve comprising:
   a valve body,
   a conically shaped chamber in said valve body,
   a first channel communicating with the base of said conically shaped chamber and extending through said valve body to the surface thereof,
   a second channel communicating with the apex of said conically shaped chamber and extending through said valve body to the surface thereof,
   a ball contained in the conically shaped chamber, said ball being larger in diameter than the diameter of said first and said second channels and said ball and said chamber being sized such that said ball may be displaced in said chamber from said apex by means so as to provide a clear straight path through said chamber from said first channel to said second channel, and